United States Patent
Chou et al.

(10) Patent No.: US 12,217,433 B2
(45) Date of Patent: Feb. 4, 2025

(54) ADAPTIVE AUTO WHITE BALANCING

(71) Applicant: CISTA SYSTEM CORP., Grand Cayman (KY)

(72) Inventors: Yang-Ting Chou, Zhubei (TW); Zhaojian Li, Fremont, CA (US)

(73) Assignee: Cista System Corp., Grand Cayman (KY)

( * ) Notice: Subject to any disclaimer, the term of this patent is extended or adjusted under 35 U.S.C. 154(b) by 326 days.

(21) Appl. No.: 17/940,891

(22) Filed: Sep. 8, 2022

(65) Prior Publication Data

US 2024/0087128 A1    Mar. 14, 2024

(51) Int. Cl.
  *G06T 7/11*    (2017.01)
  *G06T 3/4015*  (2024.01)
  *G06T 5/20*    (2006.01)
  *G06T 7/90*    (2017.01)

(52) U.S. Cl.
  CPC .............. *G06T 7/11* (2017.01); *G06T 3/4015* (2013.01); *G06T 5/20* (2013.01); *G06T 7/90* (2017.01)

(58) Field of Classification Search
  CPC ......... G06T 7/0012; G06T 7/11; G06F 18/29; G06F 18/2115
  See application file for complete search history.

(56) References Cited

U.S. PATENT DOCUMENTS

| | | | |
|---|---|---|---|
| 7,751,602 B2* | 7/2010 | Collins | G06T 7/0012 382/128 |
| 7,796,297 B2* | 9/2010 | Pollard | H04N 1/486 358/1.9 |
| 7,899,225 B2* | 3/2011 | Collins | A61B 5/4064 600/407 |
| 8,488,863 B2* | 7/2013 | Boucheron | G06T 7/0012 382/133 |
| 8,780,213 B2* | 7/2014 | Kanamori | G06T 3/40 382/253 |
| 9,288,376 B2* | 3/2016 | Walker | H04N 1/00204 |

* cited by examiner

*Primary Examiner* — Yosef Kassa
(74) *Attorney, Agent, or Firm* — Sheppard Mullin Richter & Hampton LLP

(57) ABSTRACT

This application describes systems and methods for detecting depth in deep trench isolation with semiconductor devices using test key transistors. An method comprises: capturing, by an image sensor, an image; generating a plurality of chrominance channels by converting the image into luminance-chrominance space; performing homogeneous region segmentation on the plurality of chrominance channels to generate one or more regions of interest in the plurality of chrominance channels; and projecting the regions of interest onto eigen-illuminant images to determine gray color pixels on the image, wherein the eigen-illuminant images are generated via performing a machine learning algorithm on a training set of images captured by the image sensor.

20 Claims, 4 Drawing Sheets

ADAPTIVE AUTO WHITE BALANCING

TECHNICAL FIELD

The disclosure relates generally to digital image processing.

BACKGROUND

Auto white balancing is an essential part of Image Signal Processor (ISP) pipeline in an image sensor. One goal of the auto white balancing is to remove color bias of a captured image generated by scene illumination. It aims to normalize the image's colors such that an achromatic object can appear grayish. Traditional methods in performing the auto white balancing suffer from shortcomings that they are calculation intensive and generally less accurate.

SUMMARY

Various embodiments of the present specification may include hardware circuits, systems, methods for efficient memory allocation for sparse matrix multiplications.

According to one aspect, an image sensor comprises: a memory configured to store eigen-illuminant images; an image sensing module configured to capture an image; and an image signal processor configured to: generate a plurality of chrominance channels by converting the image into luminance-chrominance space; perform homogeneous region segmentation on the plurality of chrominance channels to generate one or more regions of interest in the plurality of chrominance channels; receive the eigen-illuminant images from the memory, and project the regions of interest onto eigen-illuminant images to determine gray color pixels on the image, wherein the eigen-illuminant images are generated via performing a machine learning algorithm on a training set of images captured by the image sensor.

In some embodiments, the image sensing module is further configured to capture the image through a color filter array, and the image signal processor is further configured to: demosaic the captured image to generate a full-color image corresponding to the captured image, and perform low-pass filtering on the plurality of chrominance channels.

In some embodiments, the eigen-illuminant images are generated by: capturing the training set of images, wherein each of the training set of images include one or more gray cards exposed to one or more environment illuminants; extracting illuminant features in the training set of images using the machine learning algorithm; and generating the eigen-illuminant images according to the extracted illuminant features.

In some embodiments, the machine learning algorithm includes principal component analysis.

In some embodiments, the captured training set of images are demosaiced to generate a plurality of full-color images corresponding to the training set of images, the plurality of full-color images are converted into luminance-chrominance space, and a low-pass filtering is performed on the full-color images in the luminance-chrominance space.

In some embodiments, the image signal processor is further configured to: determine whether a pixel of the captured image belongs to one of the one or more regions of interest based on local standard deviation of the pixel, and in response to determining that the pixel of the captured image does not belong to any of the one or more regions of interest, set the pixel to null in the plurality of chrominance channels.

In some embodiments, the image signal processor is further configured to: determine a set of weight corresponding to the eigen-illuminant images, reconstruct the plurality of chrominance channels according to the set of weight, and determine the gray color pixels according to the reconstructed plurality of chrominance channels.

In some embodiments, the image signal processor is further configured to: determine a white balance gain of the captured image according to the determined gray color pixels, and generate a white balanced image corresponding to the captured image according to the white balance gain.

In some embodiments, the image signal processor is implemented on an application-specific integrated circuit (ASIC) as a part of the image sensor.

In some embodiments, the memory is a flash memory.

According to another aspect, a method for auto white balancing is provided. The method may include capturing, by an image sensor, an image; generating a plurality of chrominance channels by converting the image into luminance-chrominance space; performing homogeneous region segmentation on the plurality of chrominance channels to generate one or more regions of interest in the plurality of chrominance channels; and projecting the regions of interest onto eigen-illuminant images to determine gray color pixels on the image, wherein the eigen-illuminant images are generated via performing a machine learning algorithm on a training set of images captured by the image sensor.

According to another aspect, non-transitory computer-readable storage media store instructions that, when executed by one or more processors, cause the one or more processors to perform a method for auto white balancing. The method may include operations comprising: capturing, by an image sensor, an image; generating a plurality of chrominance channels by converting the image into luminance-chrominance space; performing homogeneous region segmentation on the plurality of chrominance channels to generate one or more regions of interest in the plurality of chrominance channels; and projecting the regions of interest onto eigen-illuminant images to determine gray color pixels on the image, wherein the eigen-illuminant images are generated via performing a machine learning algorithm on a training set of images captured by the image sensor.

These and other features of the systems, methods, and hardware devices disclosed, and the methods of operation and functions of the related elements of structure and the combination of parts and economies of manufacture will become more apparent upon consideration of the following description and the appended claims referring to the drawings, which form a part of this specification, where like reference numerals designate corresponding parts in the figures. It is to be understood, however, that the drawings are for illustration and description only and are not intended as a definition of the limits of the invention.

DETAILED DESCRIPTION

The specification is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

Auto white balancing is an essential part of Image Signal Processor (ISP) pipeline in an image sensor. One goal of the auto white balancing is to remove color bias of a captured image generated by scene illumination. It aims to normalize the image's colors such that an achromatic object can appear grayish (e.g., red, green and blue pixel colors are same or very similar). For example, a white paper is being illuminated with a red-biased light source, an image of the white paper, when captured by an image sensor, can also include a red color bias. Auto white balancing can reduce or remove the red color bias that was generated by the light source (e.g., a scene illumination).

Research in auto white balancing algorithm includes studies that examined statistical properties of the RGB color space (e.g., gray world method, or white patch method). Traditional methods in performing the auto white balancing suffer from shortcomings that they are calculation intensive and generally less accurate. Embodiments of this specification provide novel and effective methods for adaptive white balancing to the raw image from the image sensor. One example method includes: providing a plurality of bases from a train set of gray card images under different illuminants through machining learning algorithm, determining a plurality of weights according to the raw image input under unknown illuminant and the bases, reconstructing chrominance image, determining gray color pixels, and providing a white balanced image.

Figure 1:
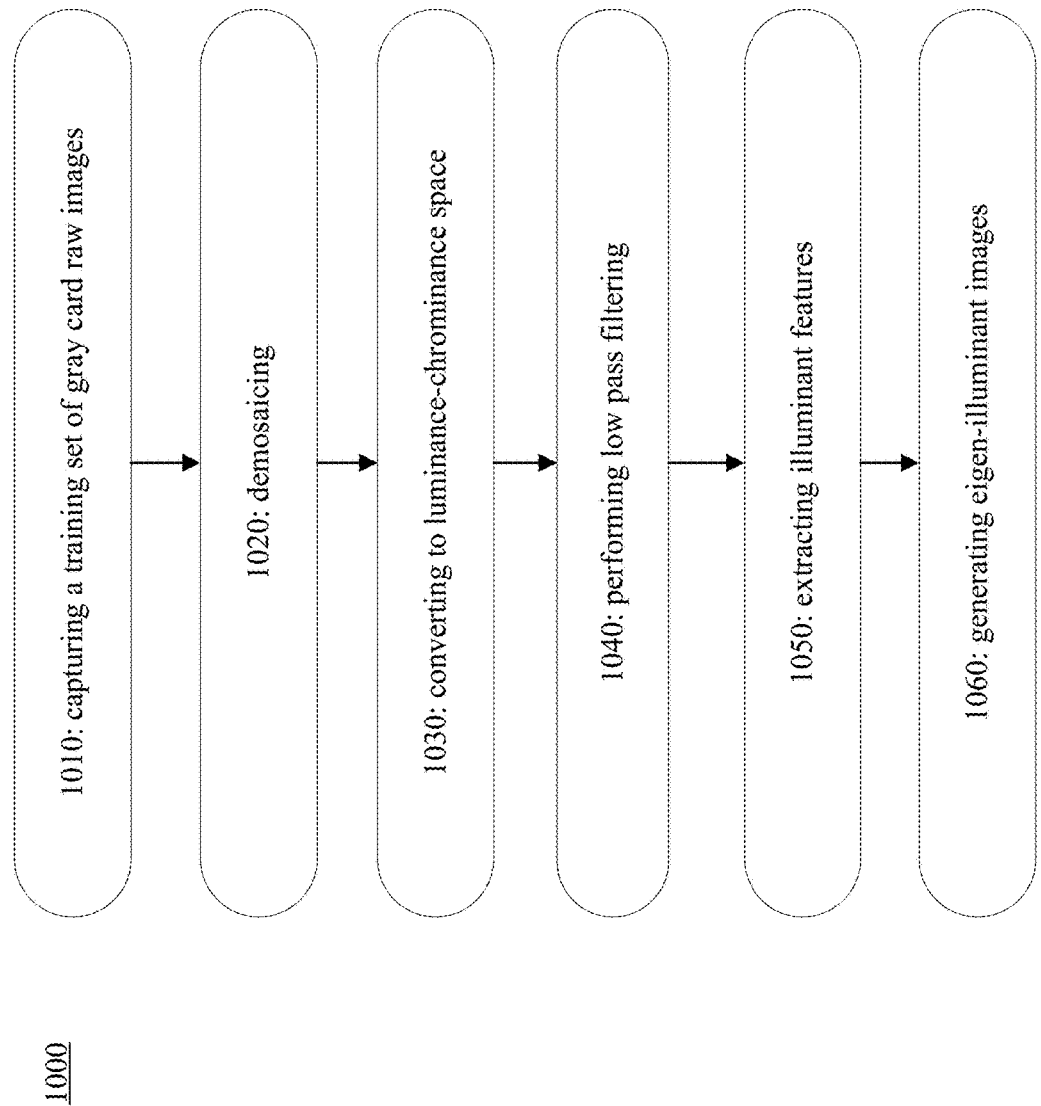
FIG. 1 is a flowchart of an example method for generating eigen-illuminant images via supervised machine learning, according to some embodiments of this specification.

FIG. 1 is a flowchart of an example method for generating eigen-illuminant images via supervised machine learning, according to some embodiments of this specification. Depending on the implementation, method 1000 of FIG. 1 may include additional, fewer, or alternative steps performed in various orders or parallel.

Step 1010 includes capturing a training set of gray card raw images. In some embodiments, the training set of gray card raw images are captured and collected by an image sensor. In some embodiments, the gray card raw images include grey cards being illuminated or exposed to one or more environment illuminants. In some embodiments, each raw image captured from the image sensor can be unedited or unprocessed. In some embodiments, a perfect subject (e.g., the grey card) can be a flat and even object of a neutral gray color. For example, the object can be 18% gray card having 18% reflectance across the visible spectrum. In addition, the gray card can be exposed to a variety of illuminants, including daylight (e.g., morning daylight, afternoon daylight, early evening daylight, etc.), tungsten, fluorescent (e.g., LED light, club light, etc.), etc. These illuminants can be selected from common settings or settings of choice. For example, if the system conducting the auto white balancing tend to work with images often exposed to daylight, the illuminants can include different types of daylight, such as morning daylight, afternoon daylight, early evening daylight, etc. In some embodiments, to generate the training set of raw images of better quality, a lighting booth (e.g., professional photography booth) can be used, and the gray card can be exposed to different illuminants in the lighting booth that can provide consistent and uniform lighting conditions.

In some embodiments, the raw image can be arranged in a Bayer pattern in which color filter array (CFA) is about half green, one quarter red, and one quarter blue. In some embodiments, such Bayer pattern can be referred to as RGGB pattern. It is appreciated that the Bayer pattern RGGB is used as an example, and any Bayer pattern, such as RGBW, RYYB, CYYM, etc. can also be used in the system.

Step 1020 includes demosaicing the gray card raw images. In some embodiments, a demosaicing algorithm can be applied to convert the raw images obtained through CFA to a full-color image with all three prime color (e.g., RGB) at each pixel. In some embodiments, demosaicing can also be referred to as CFA color interpolation.

Step 1030 includes converting the demosaiced image to luminance-chrominance space. For example, as a part of initialization, a chrominance channel transform can be applied to the three prime color channels (e.g., RGB) of the demosaiced image. As a result, two auxiliary chrominance channels can be generated. The two auxiliary chrominance channels can be referred to channels C1 and C2. For example, an RGB to YCbCr transformation can be performed to convert the red, green, and blue values of an RGB image to luminance value (i.e., Y) and chrominance values (i.e., Cb and CR) of an YCbCr image. As a result, Cb and Cr can be the two auxiliary chrominance channels C1 and C2. In another example, the auxiliary channels C1 and C2 can be a chrominance channel obtained by RGB-to-YUV transformation or R/G and B/G, or log (R/G) and log (B/G) with R, G, and B respectively being red, green, and blue channels of the demosaiced image. In some embodiments, the raw image captured by the image sensor can have a pixel resolution of M rows and N columns. As a result, the generated auxiliary chrominance channels C1 and C2 can also have a pixel resolution of M rows and N columns. In some embodiments, more than two channels can be generated. For example, the CFA can include four color channels, and the generated auxiliary channels can include three channels namely C1, C2, and C3.

Step 1040 includes performing low-pass filtering. The low-pass filtering can sometimes be referred to as smoothing, and it is used to extract low frequency components and remove high spatial frequency noise from the chrominance channels. The low-pass filtering can be applied to the chrominance channels C1 and C2. In some embodiments, a non-linear low-pass filter can be used to perform high-frequency cut processing. In some embodiments, a probabilistic method similar to low-pass filtering can also be used.

Step 1050 and step 1060 include extracting illuminant features and generating eigen-illuminant images. For example, a plurality of eigen-illuminant images can be generated by performing a machine learning algorithm on the captured training set of images depicting different light conditions. For example, each chrominance channel of C1 and C2 (e.g., having a pixel resolution of M by N) can be treated as one thin vector by concatenating rows of pixels, resulting in a vector with M by N elements or M×N=D elements. In some embodiments, the training set of images are captured under a plurality of different illuminants (e.g., 10 different illuminants). For example, the plurality of different illuminants can include daylight (e.g., morning daylight, afternoon daylight, early evening daylight, etc.), tungsten, fluorescent (e.g., LED light, club light, etc.), etc. Image data of the training set can be stored in a matrix X, where each column of the matrix is the chrominance channel data C1 or C2 of an image. Matrix X can have an array size of D×(10×2)=20D. In some embodiments, matrix X can be processed using machine learning techniques. For example, the machine learning techniques can include principal component analysis (PCA) and linear discriminant analysis (LDA). A set of basis vectors can be generated and selected as a result of the machine learning processing. In some embodiments, the basis vectors are selected based on the corresponding eigenvalues (e.g., eigenvalues in descending order). For example, the first 6 eigenvectors with larger (e.g., largest) eigenvalues can be selected. Each eigenvector has M×N=D elements, which can be reshaped to a single image with M rows and N columns. In some embodiments, the set of basis vector can be referred to as eigen-illuminant images. In some embodiments, the first 2 eigenvectors selected can provide auto white balance processing that is 90% effective when compared with using the first 6 eigenvectors. As a result, only the first 2 eigenvectors can be selected, which can provide higher efficiency in auto white balance processing and reduce hardware usage.

Figure 2:
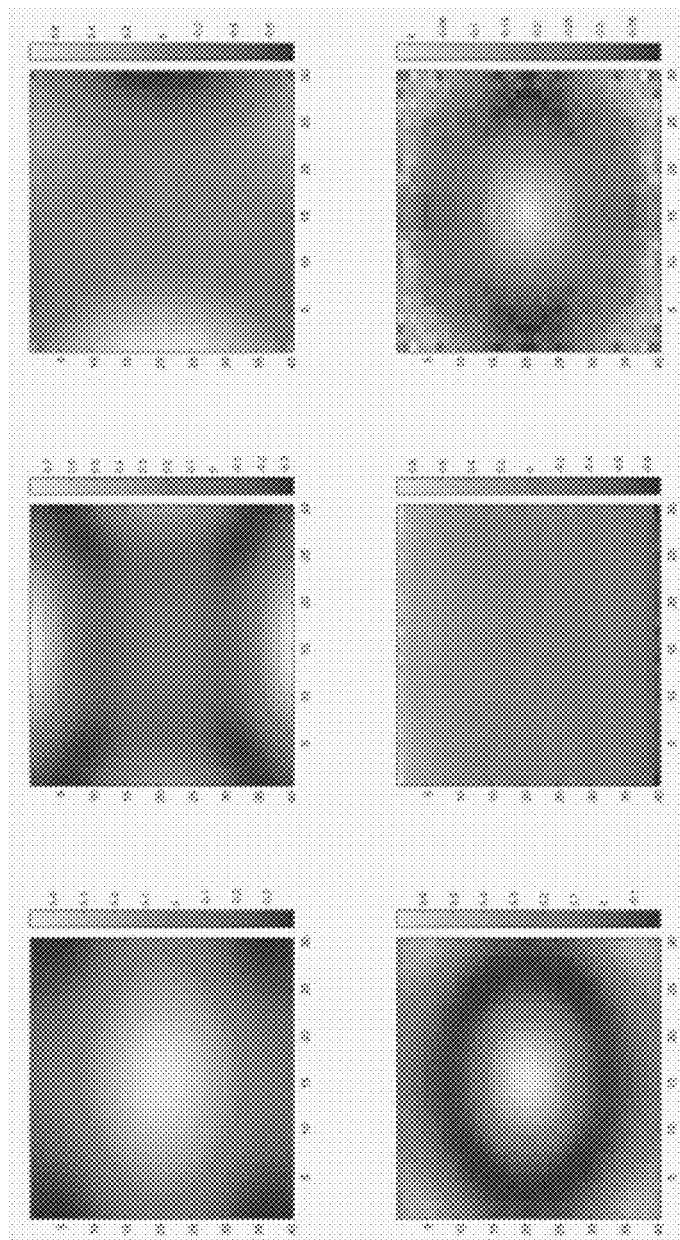
FIG. 2 is a diagram of example eigen-illuminant images generated via machine learning, according to some embodiments of this specification.

FIG. 2 is a diagram of example eigen-illuminant images generated via machine learning, according to some embodiments of this specification. Depending on the implementation, FIG. 2 may have fewer, more, and alternative components and images depending on the implementation.

As shown in FIG. 2, six selected eigen-illuminant images I are shown. In some embodiments, the six eigen-illuminant images I shown in FIG. 2 can be generated in method 1000 of FIG. 1. In some embodiments, the six eigen-illuminant images I includes $I_1$, $I_2$, $I_3$, $I_4$, $I_5$, and $I_6$. Each of the eigen-illuminant images I can have a size of M×N, making the size of I to be M×N×6. In some embodiments, these basis images can form a set of basis chrominance features of illuminants (e.g., captured by the image sensor).

Figure 3:
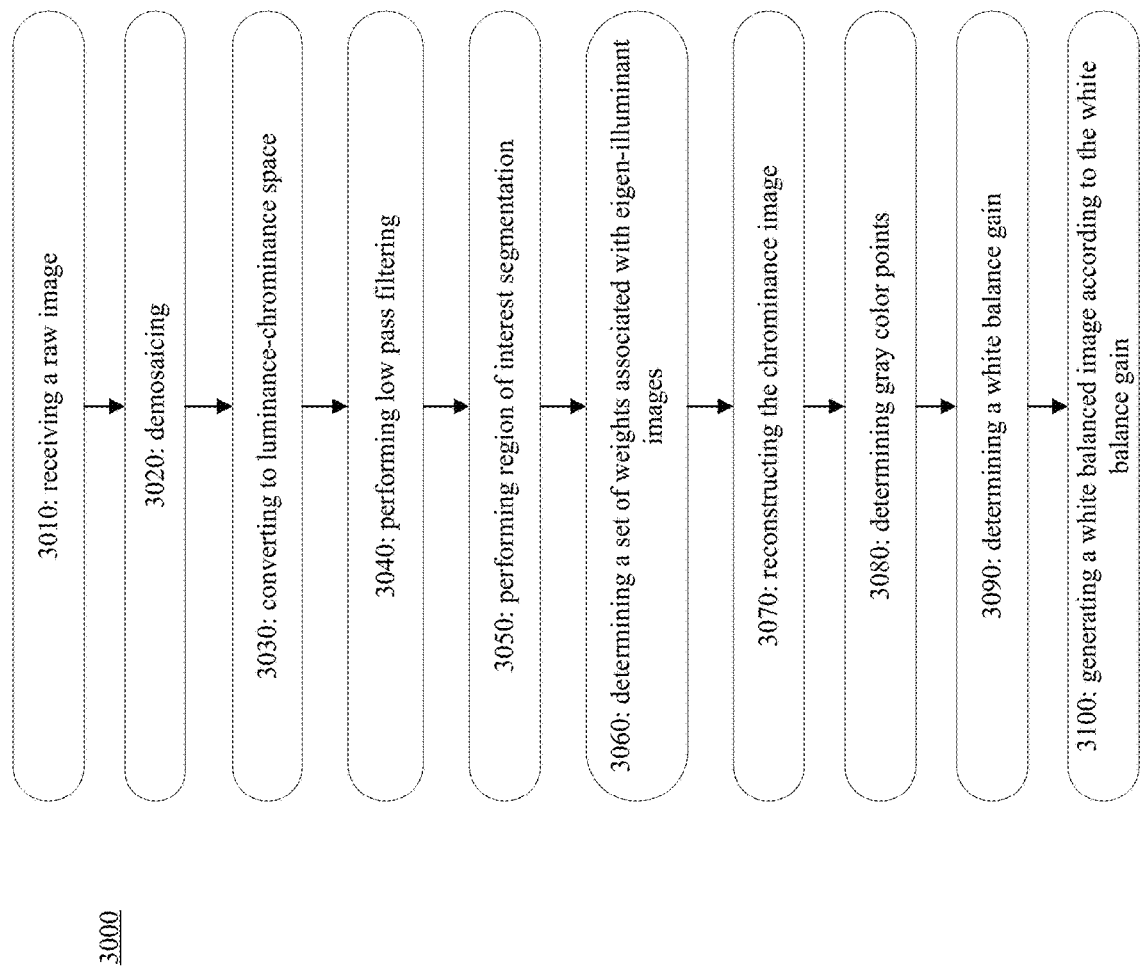
FIG. 3 is a flowchart of an example method for performing automatic white balance adjustment, according to some embodiments of this specification.

FIG. 3 is a flowchart of an example method for performing automatic white balance adjustment, according to some embodiments of this specification. Depending on the implementation, method 3000 of FIG. 3 may include additional, fewer, or alternative steps performed in various orders or parallel.

Step 3010 includes obtaining a raw image. In some embodiments, the raw image is captured by an image sensor. In some embodiments, the raw image is captured by the image sensor that was also used to capture the training sets of gray card raw images (e.g., from step 1010 of method 1000 shown in FIG. 1). Using the same image sensor to capture the raw image and the training set can increase the accuracy of method 3000 when the raw image is later projected onto the eigen-illuminant images. In some embodiments, the raw image is captured under a scene lighting condition that is unknown or uncertain to the system.

Step 3020 includes demosaicing the raw image. In some embodiments, step 3020 shown in FIG. 3 can be similar to step 1020 shown in FIG. 1. For example, a demosaicing algorithm can be applied to convert the raw image obtained through CFA to a full-color image with all three prime color (e.g., RGB) at each pixel. In some embodiments, demosaicing can also be referred to as CFA color interpolation.

Step 3030 includes converting the demosaiced image to luminance-chrominance space. In some embodiments, step 3030 shown in FIG. 3 can be similar to step 1030 shown in FIG. 1. For example, a chrominance channel transform can be applied to the three prime color channels (e.g., RGB) of the demosaiced image. As a result, two auxiliary chrominance channels can be generated. The two auxiliary chrominance channels can be referred to channels C1 and C2. For example, an RGB to YCbCr transformation can be performed to convert the red, green, and blue values of an RGB image to luminance value (i.e., Y) and chrominance values (i.e., Cb and Cr) of an YCbCr image. As a result, Cb and Cr can be the two auxiliary chrominance channels C1 and C2. In another example, the auxiliary channels C1 and C2 can be a chrominance channel obtained by RGB-to-YUV transformation or R/G and B/G, or log (R/G) and log (B/G) with R, G, and B respectively being red, green, and blue channels of the demosaiced image. In some embodiments, the raw image captured by the image sensor can have a pixel resolution of M rows and N columns. As a result, the generated auxiliary chrominance channels C1 and C2 can also have a pixel resolution of M rows and N columns. In some embodiments, more than two channels can be generated. For example, the CFA can include four color channels, and the generated auxiliary channels can include three channels namely C1, C2, and C3.

Step 3040 includes performing low-pass filtering. In some embodiments, step 3040 can be similar to step 1040. For example, the low-pass filtering can sometimes be referred to as smoothing, and it is used to extract low frequency components and remove high spatial frequency noise from the chrominance channels. The low-pass filtering can be applied to the chrominance channels C1 and C2. In some embodiments, a non-linear low-pass filter can be used to perform high-frequency cut processing. In some embodiments, a probabilistic method similar to low-pass filtering can also be used.

Step 3050 includes performing region of interest segmentation. In some embodiments, step 3050 includes processing the image to detect effective pixels that can be used in further steps. For example, the region of interest segmentation can include homogeneous (e.g., flat) region segmentation. The homogeneous or flat region segmentation allows the regions that are homogeneous or flat to be selected. In some embodiments, local standard deviation can be one of the local parameters if used to detect whether the pixels are in a flat region. In some embodiments, only those pixels which are in a region of interest (RoI) are detected as effective pixels in the chrominance channels C1 and C2. In some embodiments, pixels that are ineffective can be indicated in the chrominance channels C1 and C2. For example, pixels that are ineffective can be set to zeros or Null in the corresponding chrominance channels C1 and C2.

Step 3060 includes determining a set of weights associated with eigen-illuminant images. In some embodiments, each chrominance channel vector can then be projected onto eigen-illuminant images (e.g., eigen-illuminant images generated from method 1000 of FIG. 1, such as the eigen-illuminant images I shown in FIG. 2) to determine weight set [$a_{c1}$, $a_{c2}$] corresponding to the eigen-illuminant images. For example, the weight set can be determined as follows:

$$a_{c1} = I^T \cdot C_1 \quad (1)$$

$$a_{c2} = I^T \cdot C_2 \quad (2)$$

where each weight set of [$a_{c1}$, $a_{c2}$] has 6 coefficients that are associated with the corresponding eigen-illuminant image. These coefficients can provide information on the contribution each eigen-illuminant image has to the image (e.g., image with unknown illuminant). In some embodiments, the first 2 eigenvectors selected can provide auto white balance processing that is 90% effective when compared with using the first 6 eigenvectors. As a result, only the first 2 eigenvectors are used for projection, which can provide higher efficiency in auto white balance processing and reduce hardware usage.

Step 3070 includes reconstructing chrominance channels. In some embodiments, the two chrominance channels $C_1'$ and $C_2'$ are reconstructed as shown as follows:

$$C_1' = I \cdot a_{c1} \quad (3)$$

$$C_2' = I \cdot a_{c2} \quad (4)$$

Step 3080 includes determining gray color pixels. In some embodiments, the higher the values of the reconstructed chrominance channels $C_1'$ and $C_2'$, the higher the degrees of similarity with the pixels in the training set of gray card images. As a result, after applying a simple, fixed-level binary thresholding to reconstructed chrominance channels $C_1'$ and $C_2'$, those pixels which are supposed to be gray color pixels can be selected. For example, if both value of the reconstructed chrominance channels $C_1'$ and $C_2'$ for a pixel are larger than a threshold, this pixel is considered as a gray color pixel.

Step 3090 includes determining a white balance gain. In some embodiments, after determining gray color pixels, the average of the prime color channels (e.g., RGB) from the originally obtained raw image are determined respectively. For example, as far as these gray color pixels are concerned, the average of R, G, and B are expected to have equal or near equal values. As a result, the difference of the three averages can indicate color deviations of the raw image. The white balance gain can then be determined from the difference. For example, the color channel that has a higher level (e.g., highest level) can be set as the target mean, and the remaining two channels can be increased with a gain multiplier to match.

Step 3100 includes generating the white balanced image according to the white balance gain. This step performs white balance processing on the image data by multiplying the corresponding color component data (R, G, B) by the white balance gain output (R_gain, G_gain, B_gain) from step 3090. More specifically, it produces the white balanced image outputs (Rout, Gout, Bout) determined by the following equation: Rout=R_gain*R, Gout=G_gain*G, Bout=B_gain*B. The goal of this processing is to render neutral colors like white or gray correctly, that is the neutral color has equal red, green, blue components: Rout=Gout=Bout.

Figure 4:
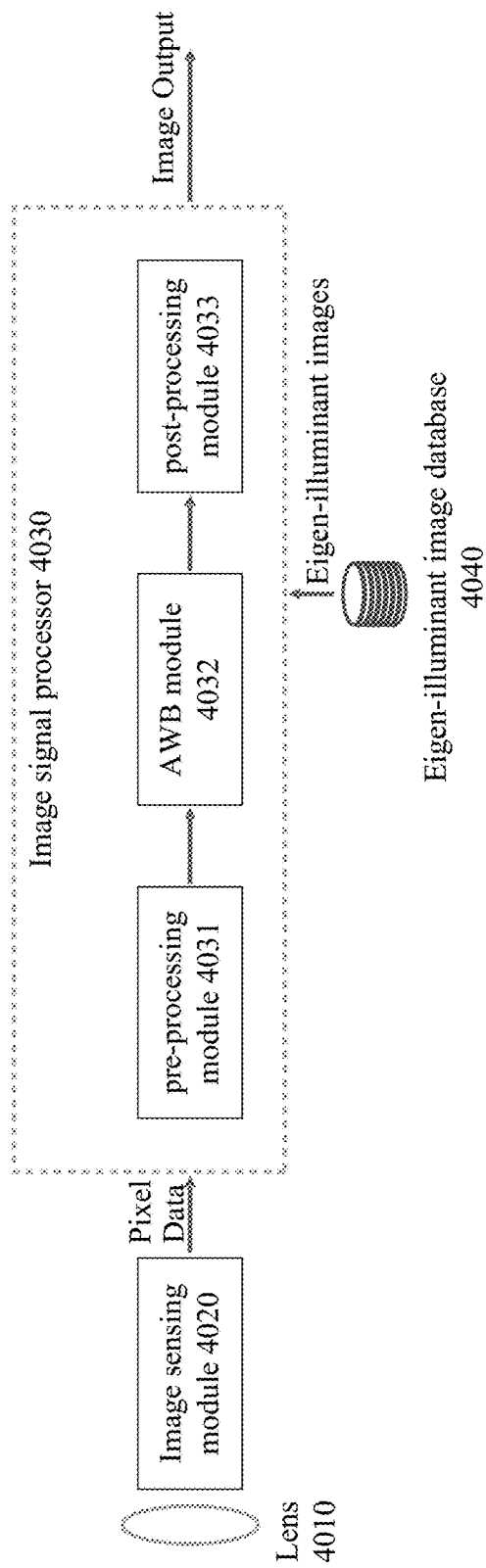
FIG. 4 is a schematic of an example image sensor apparatus, according to some embodiments of this specification.

FIG. 4 is a schematic of an example image sensor apparatus, according to some embodiments of this specification. The schematic in FIG. 4 is for illustrative purposes only, and an image sensor apparatus 4000 shown in FIG. 4 may have fewer, more, and alternative components and connections depending on the implementation.

As shown in FIG. 4, image sensor apparatus 4000 can include an image sensing module 4020 and an image signal processor 4030. In some embodiments, image sensor apparatus can further include a lens 4010 configured to capture one or more raw images for image sensing module 4020. Image sensing module 4020 may include sensors for receiving light signals and converting light signals to electronic signals. In some embodiments, image sensor apparatus 4000 can further include an eigen-illuminant image database 4040 configured to store eigen-illuminant images (e.g., eigen-illuminant images generated in method 1000 shown in FIG. 1, such as the eigen-illuminant images I shown in FIG. 2). In some embodiments, eigen-illuminant image database 4040 can include memories, such as flash memories.

In some embodiments, lens 4010 is an objective lens. The objective lens is configured to capture an optical image of a scene, under one or more scene illuminants. For example, as shown in method 3000 of FIG. 3, Image signal processor 4030 is configured to process the obtained optical image into electronic signals. For example, image sensing module 4020 can transfer to image signal process 4030 pixel data of the image. The pixel data can include, for example, raw RGGB pixel data. In some embodiments, image signal processor 4030 comprises a pre-processing module 4031 configured to receive the pixel data from image sensing module 4020 and perform pre-processing on the pixel data. In some embodiments, the pre-processing can include, for example, defective pixel correction, black level correction, lens shading correction, etc. In some embodiments, the pre-processing can further include demosaicing the pixel data, such as the demosaicing process in step 3020 of FIG. 3. In some embodiments, the pixel data may be stored in a memory storage after the pre-processing.

In some embodiments, as shown in FIG. 4, image signal processor 4030 includes an adaptive auto white balance module 4032. Adaptive auto white balance module 4032 can include one or more programmable computing devices and logic circuitry engines coupled to the memory storage and ISP pipeline. Adaptive auto white balance module 4032 can be configured to perform adaptive auto white balance processing, such as those shown in method 3000 of FIG. 3. For example, adaptive auto white balance module 4032 can be configured to perform steps 3030, 3040, 3050, 3060, 3070, 3080, 3090, and 3100 of method 3000 to generate a white balanced image corresponding to the obtained raw image. In some embodiments, image signal processor 4030 is implemented on an application-specific integrated circuit (ASIC) or a field programmable gate arrays (FPGA). In some embodiments, the eigen-illuminant images can be obtained from eigen-illuminant image database 4040. In some embodiments, eigen-illuminant image database 4040 is communicatively coupled with image signal processor 4030, e.g., outside the ASIC that implements image signal processor 4030. In some embodiments, eigen-illuminant image database 4040 can be implemented on the same hardware (e.g., same ASIC) as image signal processor 4030.

In some embodiments, as shown in FIG. 4, image signal processor 4030 further comprises a post-processing module 4033. Post-processing module 4033 is configured to receive the white balanced image from adaptive auto white balance module 4032 and perform post-processing on the white balanced image. In some embodiments, the post-processing can include, for example, color correction, noise reduction, and gamma correction, etc.

Embodiments of this application provide systems and methods for effectively performing auto white balancing using eigen-illuminant images generated through machine learning techniques. The eigen-illuminant images can be generated through a training set of images captured by the same image sensor to increase the effectiveness of the eigen-illuminant images in performing the auto white balancing. Moreover, the methods can be performed by hardware implemented on an ASIC or an FPGA as a part of the image sensor, allowing for an efficient ISP pipeline to generate auto white balanced images.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. An image sensor apparatus, comprising:
   a memory configured to store eigen-illuminant images;
   an image sensing module configured to capture an image; and
   an image signal processor configured to:
   generate a plurality of chrominance channels by converting the image into luminance-chrominance space;
   perform homogeneous region segmentation on the plurality of chrominance channels to generate one or more regions of interest in the plurality of chrominance channels;
   receive the eigen-illuminant images from the memory, and
   project the regions of interest onto eigen-illuminant images to determine gray color pixels on the image, wherein the eigen-illuminant images are generated via performing a machine learning algorithm on a training set of images captured by the image sensor.

2. The image sensor apparatus of claim 1, wherein:
   the image sensing module is further configured to capture the image through a color filter array, and
   the image signal processor is further configured to:
   demosaic the captured image to generate a full-color image corresponding to the captured image, and
   perform low-pass filtering on the plurality of chrominance channels.

3. The image sensor apparatus of claim 1, wherein the eigen-illuminant images are generated by:
   capturing the training set of images, wherein each of the training set of images include one or more gray cards exposed to one or more environment illuminants;
   extracting illuminant features in the training set of images using the machine learning algorithm; and
   generating the eigen-illuminant images according to the extracted illuminant features.

4. The image sensor apparatus of claim 1, wherein the machine learning algorithm includes principal component analysis.

5. The image sensor apparatus of claim 4, wherein:
   the captured training set of images are demosaiced to generate a plurality of full-color images corresponding to the training set of images,
   the plurality of full-color images are converted into luminance-chrominance space, and
   a low-pass filtering is performed on the full-color images in the luminance-chrominance space.

6. The image sensor apparatus of claim 1, wherein the image signal processor is further configured to:
   determine whether a pixel of the captured image belongs to one of the one or more regions of interest based on local standard deviation of the pixel, and
   in response to determining that the pixel of the captured image does not belong to any of the one or more regions of interest, set the pixel to null in the plurality of chrominance channels.

7. The image sensor apparatus of claim 1, wherein the image signal processor is further configured to:
   determine a set of weight corresponding to the eigen-illuminant images,
   reconstruct the plurality of chrominance channels according to the set of weight, and
   determine the gray color pixels according to the reconstructed plurality of chrominance channels.

8. The image sensor apparatus of claim 7, wherein the image signal processor is further configured to:
   determine a white balance gain of the captured image according to the determined gray color pixels, and
   generate a white balanced image corresponding to the captured image according to the white balance gain.

9. The image sensor apparatus of claim 1, wherein the image signal processor is implemented on an application-specific integrated circuit (ASIC) as a part of the image sensor.

10. The image sensor apparatus of claim 1, wherein the memory is a flash memory.

11. A method of auto white balancing, comprising:
capturing, by an image sensor, an image;
generating a plurality of chrominance channels by converting the image into luminance-chrominance space;
performing homogeneous region segmentation on the plurality of chrominance channels to generate one or more regions of interest in the plurality of chrominance channels; and
projecting the regions of interest onto eigen-illuminant images to determine gray color pixels on the image, wherein the eigen-illuminant images are generated via performing a machine learning algorithm on a training set of images captured by the image sensor.

12. The method of claim 11, wherein:
the image is captured by the image sensor through a color filter array, and
the method further comprises:
demosaicing the captured image to generate a full-color image corresponding to the captured image.

13. The method of claim 11, further comprising:
performing low-pass filtering on the plurality of chrominance channels.

14. The method of claim 11, further comprising:
capturing the training set of images, wherein each of the training set of images include one or more gray cards exposed to one or more environment illuminants;
extracting illuminant features in the training set of images using the machine learning algorithm; and
generating the eigen-illuminant images according to the extracted illuminant features.

15. The method of claim 14, wherein the machine learning algorithm includes principal component analysis.

16. The method of claim 14, further comprising:
demosaicing the captured training set of images to generate a plurality of full-color images corresponding to the training set of images;
converting the plurality of full-color images into luminance-chrominance space; and
performing low-pass filtering on the full-color images in the luminance-chrominance space.

17. The method of claim 11, wherein:
performing homogeneous region segmentation on the plurality of chrominance channels to generate the one or more regions of interest in the plurality of chrominance channels further comprises:
determining whether a pixel of the captured image belongs to one of the one or more regions of interest based on local standard deviation of the pixel, and
the method further comprises:
in response to determining that the pixel of the captured image does not belong to any of the one or more regions of interest, setting the pixel to null in the plurality of chrominance channels.

18. The method of claim 11, wherein projecting the regions of interest onto the eigen-illuminant images to determine the gray color pixels on the image further comprises:
determining a set of weight corresponding to the eigen-illuminant images,
reconstructing the plurality of chrominance channels according to the set of weight, and
determining the gray color pixels according to the reconstructed plurality of chrominance channels.

19. The method of claim 18, further comprising:
determining a white balance gain of the captured image according to the determined gray color pixels; and
generating a white balanced image corresponding to the captured image according to the white balance gain.

20. Non-transitory computer-readable storage media storing instructions that, when executed by one or more processors, cause the one or more processors to perform operations comprising:
capturing, by an image sensor, an image;
generating a plurality of chrominance channels by converting the image into luminance-chrominance space;
performing homogeneous region segmentation on the plurality of chrominance channels to generate one or more regions of interest in the plurality of chrominance channels; and
projecting the regions of interest onto eigen-illuminant images to determine gray color pixels on the image, wherein the eigen-illuminant images are generated via performing a machine learning algorithm on a training set of images captured by the image sensor.

* * * * *